United States Patent [19]
Keller et al.

[11] Patent Number: 5,795,013
[45] Date of Patent: Aug. 18, 1998

[54] ENERGY ABSORBING TRIM, AND METHODS OF CONSTRUCTING AND UTILIZING SAME

[75] Inventors: James Keller, Dublin; Anthony Spataro, Bellefontaine; Allen White, Dublin, all of Ohio

[73] Assignee: Honda Giken Kogyo Kabushiki Kaisha, Tokyo, Japan

[21] Appl. No.: 667,845

[22] Filed: Jun. 20, 1996

[51] Int. Cl.$^6$ ............................................. B60R 121/04
[52] U.S. Cl. ............................................. 296/188; 280/751
[58] Field of Search .................................. 296/39.1, 188, 296/189; 280/751, 748, 752; 206/591, 585; 293/133, 136

[56] References Cited

U.S. PATENT DOCUMENTS

| | | | |
|---|---|---|---|
| 4,786,100 | 11/1988 | Kleemann | 296/146 |
| 4,803,108 | 2/1989 | Leuchten | 428/118 |
| 4,890,877 | 1/1990 | Ashtiani | 296/146 |
| 5,040,335 | 8/1991 | Grimes | 49/502 |
| 5,306,066 | 4/1994 | Saathoff | 296/189 X |
| 5,382,051 | 1/1995 | Glance | 280/751 |
| 5,433,478 | 7/1995 | Naruse | 280/748 |
| 5,507,540 | 4/1996 | Pernot | 293/136 X |
| 5,573,272 | 11/1996 | Teshima | 296/146.7 X |

*Primary Examiner*—Gary C. Hoge
*Attorney, Agent, or Firm*—Weiner, Carrier, Burt & Esser, P.C.; Joseph P. Carrier; Irving M. Weiner

[57] ABSTRACT

An energy absorbing trim structure for a vehicle comprises an ornamental panel shaped to cover a rigid structural member of a vehicle body, a plurality of fins or projections provided on one face of the panel in an aligned arrangement, and an elongate stabilizing member also provided on the face of the panel and innerconnecting the fins to give lateral stability thereto.

21 Claims, 4 Drawing Sheets

ENERGY ABSORBING TRIM, AND METHODS OF CONSTRUCTING AND UTILIZING SAME

BACKGROUND OF THE INVENTION

1. Field of the Invention

The present invention pertains to a trim panel for covering rigid structural members of a vehicle body, and which has an impact attenuating capability in the event the panel is impacted by a passenger in the vehicle during a collision. More particularly, the present invention pertains to such a trim panel provided or reinforced with energy absorbing spacers which are adapted to be non-resiliently crushed when the panel is impacted by a passenger in a vehicle during a collision, for thereby absorbing some of the force of the impact and reducing the possibility of an injury to the passenger.

2. Description of Relevant Art

Vehicles today include many safety features for protecting the occupants or passengers in the vehicle in the event of a collision. Not only such apparent features as safety belts and air bags, but those less apparent features including safety glass, energy absorbing door panels, etc. A desiderata in the art is to provide some degree of protection for the passengers relative to their impacting against any rigid structural member of the vehicle body during a collision.

In this regard, the rigid pillars framing the doors and windows of the vehicles are conventionally covered with trim panels which have an ornamental appearance, and which also provide some amount of energy absorption in the event that a passenger's head or other body part impacts against the trim panels during a collision, whereby the passenger's head or other body part does not impact against the rigid structural member with full force.

Additionally, it is known to provide layer(s) of plastic foam between a rigid structural member and a trim panel covering same. The plastic foam is compressed between the rigid structural member and the trim panel when the trim panel is strongly impacted during a collision, for thereby absorbing some of the impact's force. Foam also provides some amount of insulation to dampen noises and vibrations passing from the rigid structural member to the interior of the vehicle. Although plastic foam is somewhat effective as impact attenuators, there are limitations associated therewith, such as significant additional expense involved with manufacture of the foam itself and especially with assembling the foam together with the trim panels in covering the rigid structural members. Additionally, the foam can be relatively bulky taking up valuable space in the vehicle interior, and add some weight to the vehicle.

Further, there are several known energy absorbing structures associated with the doors and door trim panels for vehicles, including those disclosed in U.S. Pat. Nos. 5,433,478, 5,040,335, 4,890,877, and 4,786,100. According to U.S. Pat. No. 5,433,478, a door trim is formed with a plurality of ribs which extend from the door trim toward an exterior of the vehicle and oppose the rigid door member. When impact load is imparted to the door member during a side collision of the vehicle, the door member is pushed inwardly of the vehicle and abuts the ribs which then plastically deform thereby absorbing the impact load. The ribs have different lengths and/or rigidity so that during a collision some will provide a large energy absorbing characteristic for a short period and others will provide a smaller energy absorbing characteristic for a subsequent longer time period.

Somewhat similarly, U.S. Pat. No. 5,040,335 discloses a composite door panel including a rigid plastic shell having an ornamental surface disposed toward the interior of the vehicle, and a plurality of foam boxes connected to the opposite surface of the rigid shell and with open ends pointing outwardly of the vehicle. The foam boxes absorb side impact energy directed against the side of the outer door panel during a side collision.

U.S. Pat. No. 4,890,877 discloses an energy absorbing panel constructed of resin coated fabric which is molded into a generally planar sheet having a plurality of spaced apart conical projections and an adhesive coating planar sheet which is placed over one or both faces of the molded sheet and bonded thereto. A number of each of the sheets may be stacked and bonded together to form energy absorbing panel structures of different shapes and sizes, and which may be attached to outwardly facing surfaces of a trim panel of the vehicle door. In the event of a side collision of the door, the conical projections collapse to absorb energy for protecting the vehicle occupants in the event that they impact against the door trim panels during the collision.

Somewhat differently still, U.S. Pat. No. 4,786,100 discloses an internal structure for a door trim panel which is deformable under energy dissipation in the event of a collision. The internal structure includes a base deformation plate having a number of differently sized and shaped webs projecting therefrom such that the structure is subdivided into different sections matched in rigidity to the individual body regions of a passenger which may impact against the inner door panel during a collision, for thereby reducing risk of injury to the different body parts in case of a lateral impact against the panel.

Again, although the known energy absorbing structures for the interior panels of vehicle doors including those discussed above, are effective for their intended functions, there are limitations and disadvantages associated therewith, especially in relation to use of the structures apart from the vehicle doors. For example, each of the disclosed structures is relatively large or bulky, but because the doors themselves are conventionally large in width, the energy absorbing structures may be incorporated therein without significantly increasing the door size. On the other hand, if such known energy absorbing devices were incorporated into all of the interior trim panels of a vehicle, this would significantly reduce head space and other interior space within the vehicle for a given outer vehicle dimension, and otherwise interfere with the vehicle driver's line of sight.

Further, the described energy absorbing devices are somewhat complex in structure, noting that they are formed as composites of several different materials or material layers having different rigidities, lengths, elasticities, etc. so that the known devices are expensive in terms of manufacturing costs and assembly costs.

SUMMARY OF THE INVENTION

The present invention has been developed to overcome the limitations and disadvantages of known energy absorbing structures for interior trim panels of the vehicles, and to generally fulfill a need in the art for a low cost, compact and highly versatile energy absorbing safety structure for use in relation to interior trim panels of vehicles.

According to the invention there is provided an energy absorbing trim comprising: a panel shaped to cover a rigid structural member; a plurality of fins provided on one face of the panel in an aligned arrangement; and a stabilizer also provided on the face of the panel and interconnecting fins to each other for lateral stability.

Preferably, the fins are arranged in a plurality of aligned rows on area(s) of said panel likely to be impacted by an occupant of the vehicle during a collision, and will also include a plurality of stabilizers, one stabilizer interconnecting the fins in each row. Most preferably, each of the fins is a substantially linear member and the stabilizer(s) extend substantially perpendicular to the fins connected thereby through centrally intermediate portions of the fins; the rows of fins extend parallel to and are spaced from each other along a plane parallel to the stabilizers; the fins and stabilizer (s) are molded integrally with the panel of an appropriate plastic. The fins and stabilizer(s) will preferably have a shape or height corresponding to but smaller than a cross-sectional contour of the panel.

The fins and stabilizers are crushed between the panel and the rigid structural member covered by the panel when the panel is sufficiently impacted by a passenger's head or other body part during a collision, for thereby absorbing energy of the impact and allowing a smooth and controlled deceleration of the passenger's body part during the impact. Because the fins are interconnected by the stabilizer(s), they resist simply snapping or breaking at the bases thereof adjacent to the panel, but instead are crushed from their free edges facing the rigid structural member toward the panel, which crushing action absorbs the force of the impact with the panel.

The energy absorbing characteristics of the stabilized fins according to the invention may be easily tuned for any desired application or deceleration characteristic by varying different features of the fins and stabilizers, including rib width, height, pitch, shape, draw angle, density, number of rows, space between rows, etc.

It is an object of the present invention to provide an energy absorbing structure for use in conjunction with interior trim panels of vehicles which is simple in structure, compact, and low in cost.

It is another object of the invention to provide such an energy absorbing device which can be easily modified in one or more characteristics thereof for tuning the device to substantially any desired application.

It is a further object of the invention to provide such an energy absorbing device which can be constructed of inexpensive materials and can be simply assembled together with the trim panel on a vehicle.

Other objects, advantages and salient features of the invention will become apparent from the following detailed description which, together with the annexed drawings, discloses preferred embodiments of the invention.

DETAILED DESCRIPTION OF THE PREFERRED EMBODIMENTS

Figure 1:
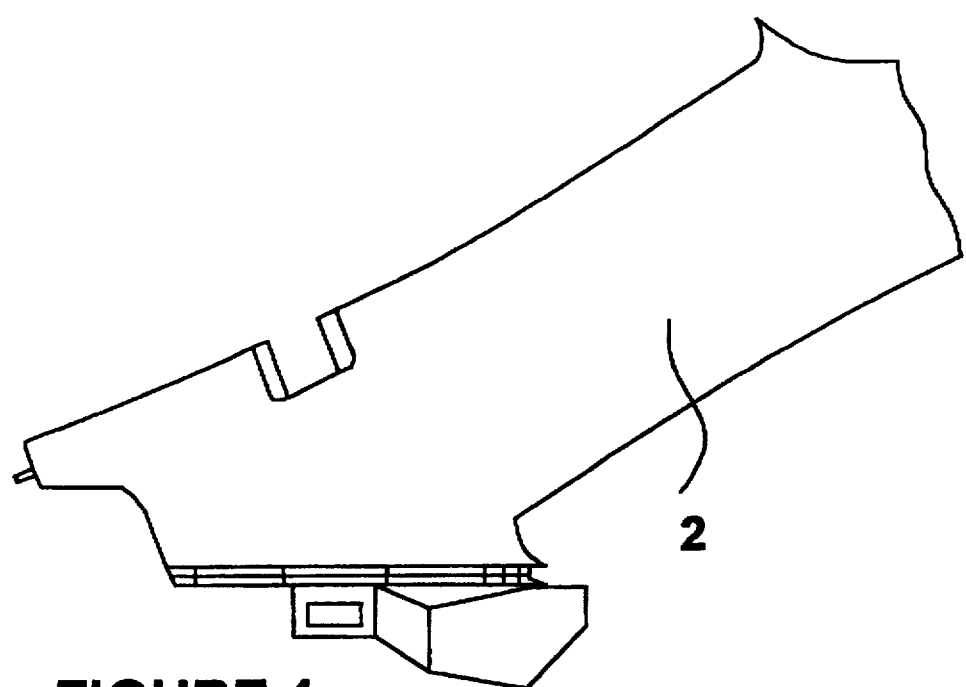
FIG. 1 is a front elevational view of a molded trim panel shaped to cover a rigid structural pillar of a vehicle.
Figure 2:
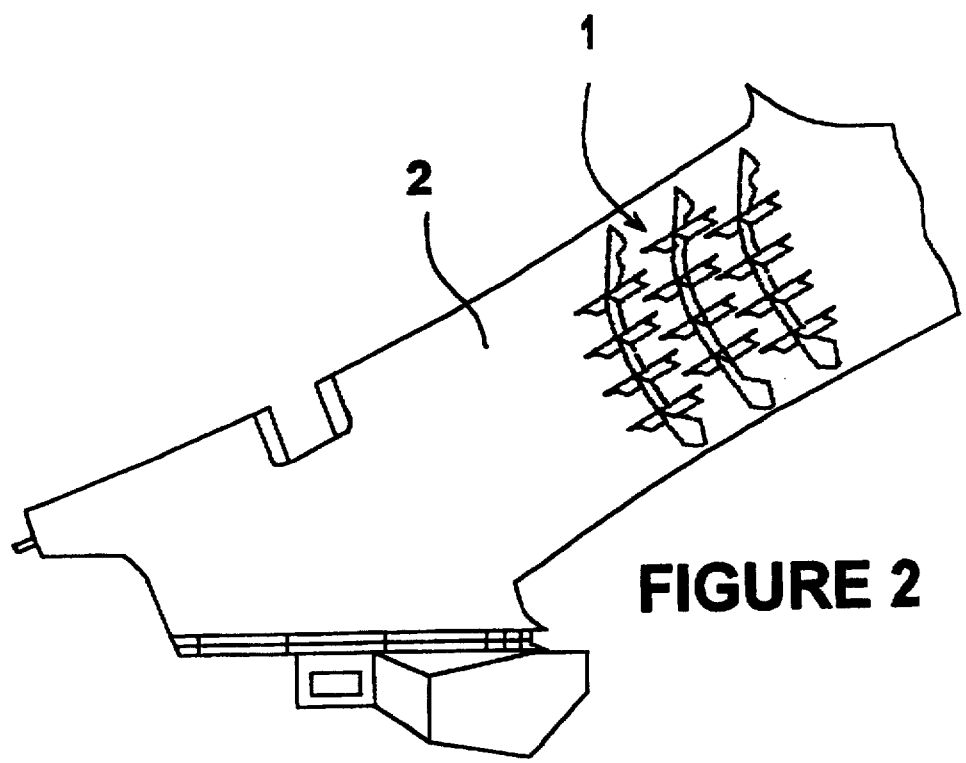
FIG. 2 is a view similar to FIG. 1, but additionally showing, in broken line, an energy absorbing device according to a preferred embodiment of the invention disposed on a rear surface of the panel.
Figure 3:
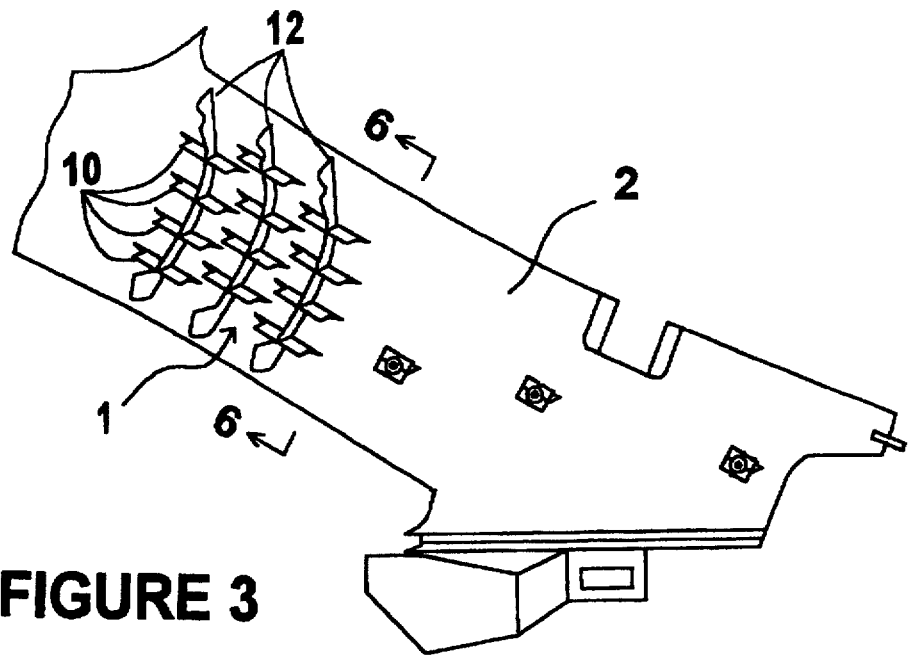
FIG. 3 is a rear view of the panel and energy absorbing device of FIG. 2.
Figure 4:
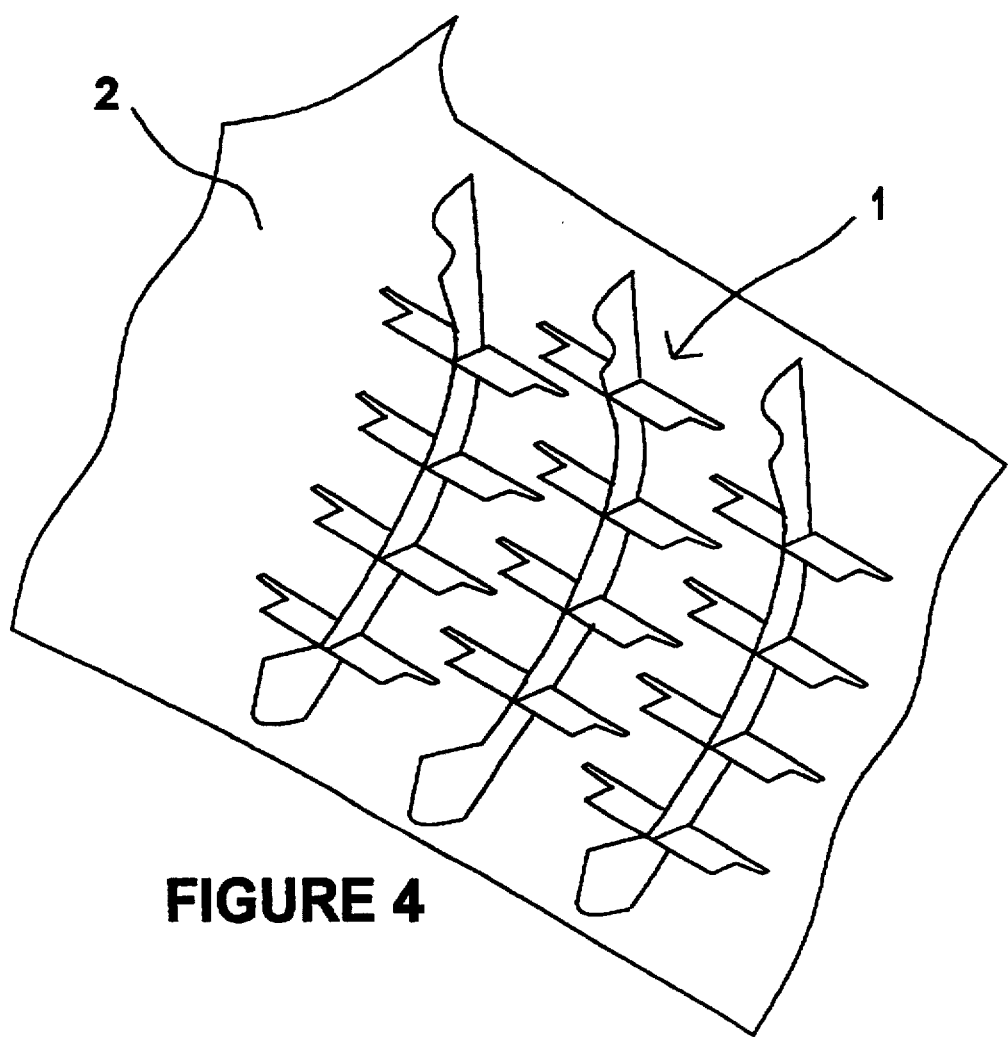
FIG. 4 is an enlarged view of the energy absorbing device shown in FIG. 3.

Referring to FIGS. 1–4, there is shown a preferred embodiment of an energy absorbing device for a trim panel according to the invention. The energy absorbing device 1 is shown disposed on a trim panel 2 which is shaped to cover a rigid structural pillar (not shown) of a vehicle. The panel 2 is molded of appropriate plastic material. One face of the panel 2 is exposed inwardly of the vehicle, while a second face of the panel faces outwardly of the vehicle and has fastening means (not shown) such as clips provided thereon for attaching the panel to the rigid structural members of the vehicle body which it covers. According to conventional practice, the panel 2 has a somewhat convex cross-section so that the face extending into the passenger compartment of the vehicle has smooth, rounded surfaces and such that there is a space between the outer facing surface of the panel and the rigid structural members.

The energy absorbing device 1 according to the invention includes a plurality of fins or projections 10 provided on the outer face of the panel 2 at a prescribed angle relative to the underlying rigid structural member (preferably perpendicular), and in an aligned arrangement such as a plurality of vertically extending rows as depicted, and stabilizers 12 which interconnect all of the fins in a given row for giving lateral stability thereto. As depicted, the fins 10 are preferably linear members arranged parallel to each other in a given row, while the connecting stabilizer 12 for each row extends perpendicular through a substantially central portion of each of the fins in the row so that each of the stabilized row of fins is shaped like a ladder.

Figure 6:
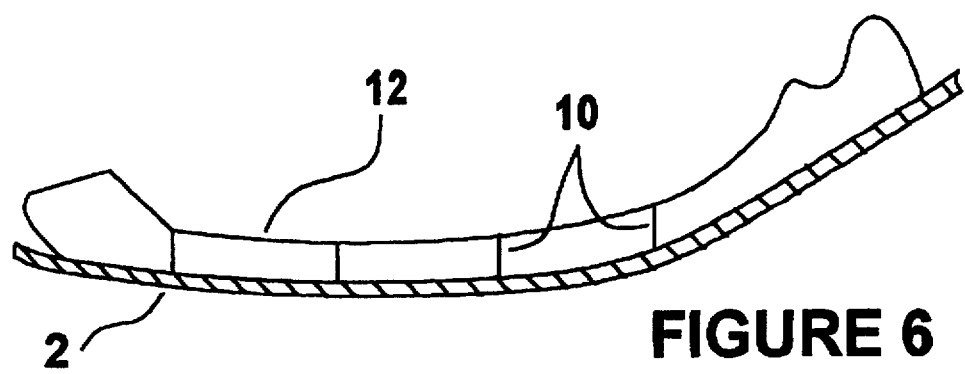
FIG. 6 is a cross-sectional view looking in a direction of line 6-6 in FIG. 3.

The stabilizers 12, and hence the rows of fins, preferably extend parallel to each other. Both the stabilizers 12 and the fins 10 may be contoured to the shape of the panel surface in which they are disposed, i.e., in the depicted embodiment, the stabilizers 12 are curved to follow the curvature of the panel 2 and the fins 10 are of a substantially uniform size and are spaced substantially uniformally along the curved stabilizers 12 as best shown in FIG. 6. With such structure, substantially all the fins and stabilizers will be engaged with the rigid structural members when the panel 2 is placed thereover.

It is preferred that the fins 10 and stabilizers 12 are integrally molded with the panel from appropriate plastic materials. Such integral construction assures proper alignment and disposition of the fins and stabilizers on the panel, and greatly facilitates assembly of the panel 2 and the energy absorption device 1 to the underlying rigid structural members, i.e., the assembly procedure is essentially the same as that for joining a conventional trim panel without any energy absorbing device to the underlying rigid structural members. Of course, it is possible to manufacture an energy absorbing structure separately from the panel 2, and subsequently assemble the panel, the energy absorbing device 1 and the underlying rigid structural member(s) together such as by bonding the energy absorbing device to the panel or rigid structural member before the panel and the rigid structural member are joined together, or by clamping the energy absorbing device between the panel and the rigid structural member as the latter two components are joined together.

When the energy absorbing device 1 is molded integrally with or subsequently bonded to the panel 2, the energy absorbing device also desirably functions to increase the structural rigidity and strength of the panel 2, in addition to its energy absorbing function.

Figure 5:
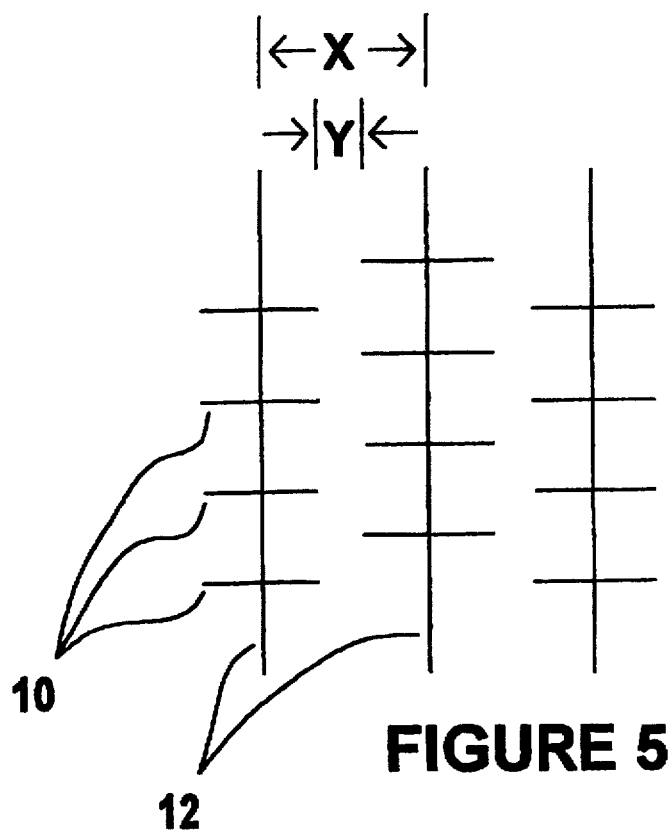
FIG. 5 is a plan view of the energy absorbing device of FIG. 2.
Figure 5A:
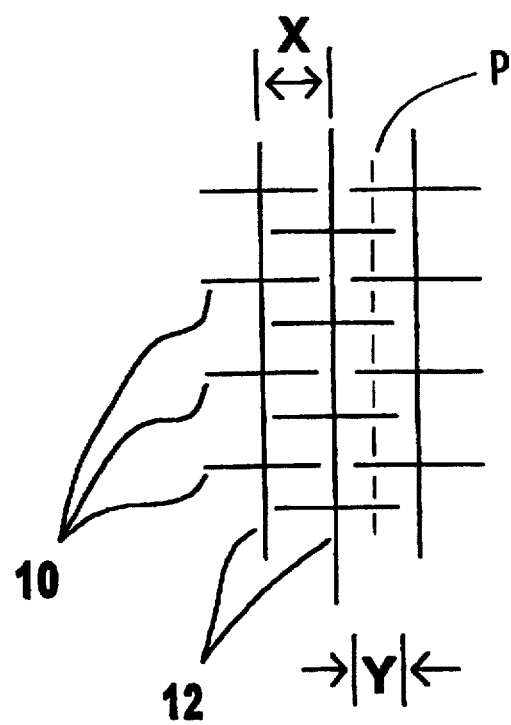
FIG. 5a is a plan view similar to FIG. 5, but showing a modified energy absorbing device.

According to an important aspect of the invention, the energy absorbing characteristics of the energy absorbing device 1 may be easily tuned for use in substantially any application by appropriately varying different features of the fins 10 and/or the stabilizers 12, including the width, length, height, pitch, shape, draw angle, density, etc. of the fins 10 and/or the stabilizers 12. With reference to FIG. 5, for example, the pitch X between adjacent stabilizers 12, the amount of overlap or lap Y between fins 10 of adjacent rows, and/or the number of fins 10 per row may be varied to change the energy per unit area which may be absorbed by the energy absorbing device 1. Similarly, the number and length of the rows of fins may be varied to change the area of the energy absorbing device 1 as desired or necessary corresponding to those areas of the panel 2 or of some other panel which are likely to be impacted by a passenger's head or other body part during a collision. As shown in FIG. 5, the stabilizers 12 in adjacent rows are spaced sufficiently from each other that the ends of the fins 10 in the adjacent rows do not overlap with each other along a plane extending parallel to the stabilizers, but rather are spaced from each other by the distance Y. Referring to FIG. 5a, which is a modification of the device shown in FIG. 5, the ends of the fins 10 in adjacent parallel rows overlap with each other along a plane P extending parallel to the stabilizers 12, by the distance Y.

As shown in the drawings, fins 10 and stabilizers 12 preferably are formed with approximately the same thickness of material as each other, but generally have a significantly smaller thickness than that of the panel 2. For example, the fins 10 and stabilizer 12 have a thickness in a range of ⅕–½ of the thickness of the panel 2.

According to another important aspect of the invention, the energy absorbing device 1 according to the invention is relatively compact, such that the stabilizers 12 and fins 10 follow the contour of the panel 2, whereby the panel can be constructed with outer dimensions which are substantially the same as conventional trim panels having no energy absorbing device associated therewith. For example, if the panel has a depth or radius of curvature of 3–6 cm the fins and stabilizers could have a height of 1–2 cm. Thus, the passenger accommodating space within the vehicle is not reduced with the addition of the energy absorbing device 1 according to the invention, and the energy absorbing device does not otherwise interfere with a driver's sight line, head room or other driving characteristics which it would if it were necessary to increase the size of the trim panel to accommodate the energy absorbing device. The height of the fins 10 and/or the stabilizers 12 may be varied or adjusted along a length thereof to accommodate a shape of the rigid structural member.

Although there have been described in present what are considered to be the preferred embodiments of the invention, it will be understood that modifications and variations may be made thereto without departing from the spirit or essential characteristics of the invention. For example, it will be understood that the energy absorbing device according to the invention are not limited for use in relation to the trim panels covering C pillars of vehicles such as shown in the drawings, but may be used in other trim panels covering other rigid structural members of the vehicle body likely to be imparted by other body parts of passengers in the vehicles, such as knees, chests, arms, abdomen, etc.

The scope of the invention is indicated by the appended claims, rather than by the foregoing description.

We claim:

1. An energy absorbing trim for a vehicle, comprising:
    a panel shaped to cover a rigid structural member of a body of the vehicle;
    a plurality of separate fins provided on one face of said panel in an aligned arrangement; and
    a stabilizer also provided on said face of said panel and interconnecting said fins to each other for lateral stability;
    said trim including a single said stabilizer interconnecting said plurality of said fins in said aligned arrangement; and
    said stabilizer extending through longitudinally intermediate portions of said separate fins such that opposite ends of each said fin project away from said stabilizer.

2. An energy absorbing trim according to claim 1, wherein said fins are disposed in an independent aligned row, and said stabilizer extends through intermediate portions of said fins substantially perpendicular to said fins.

3. An energy absorbing trim according to claim 1, wherein said panel, said fins, and said stabilizer are integrally molded as a unitary member.

4. An energy absorbing trim according to claim 1, wherein said panel is contoured to project a distance within a passenger compartment of a vehicle, and said fins and stabilizer have a height substantially equal to said distance.

5. An energy absorbing trim according to claim 4, wherein said fins and stabilizer are shaped to follow a contour of said panel and to extend toward the rigid structural member at a prescribed angle.

6. An energy absorbing trim according to claim 1, wherein said fins and stabilizer are engaged between the panel and the rigid structural member when the panel is placed over the rigid structural member.

7. An energy absorbing trim for a vehicle, comprising:
    a panel shaped to cover a rigid structural member of a body of the vehicle;
    a plurality of separate fins provided on one face of said panel in an aligned arrangement;
    a stabilizer also provided on said face of said panel and interconnecting said fins to each other for lateral stability;
    said fins being arranged in a plurality of independent aligned rows; and
    said trim including a plurality of said stabilizers, one of said stabilizers interconnecting all of the fins in a corresponding said row.

8. An energy absorbing trim according to claim 7, wherein said rows are disposed substantially parallel to each other.

9. An energy absorbing trim according to claim 3, wherein said panel, said fins, and said stabilizers are integrally molded as a unitary member.

10. An energy absorbing trim according to claim 7, wherein said separate fins in adjacent ones of said independent aligned rows overlap with each other along a plane extending substantially parallel to said stabilizers.

11. An energy absorbing trim according to claim 8, wherein the fins in adjacent rows do not overlap with each other along a plane extending parallel to said stabilizers.

12. An energy absorbing trim for a vehicle, comprising:
    a panel shaped to cover a rigid structural member of a body of the vehicle;
    a plurality of fins provided on one face of said panel in an aligned arrangement;
    a stabilizer also provided on said face of said panel and interconnecting said fins to each other for lateral stability;

said fins being arranged in a plurality of aligned rows, and said trim including a plurality of stabilizers, one of said stabilizers interconnecting all of the fins in a corresponding said row;

said rows are disposed substantially parallel to each other; and the fins in adjacent rows overlap with each other along a plane extending parallel to said stabilizers.

13. A trim structure for covering a rigid support member, comprising:

a trim having a first side and a second opposite side;

energy absorbing means formed integrally with said second side of said trim and protruding therefrom;

said energy absorbing means including a plurality of fins and means for connecting said fins;

said connecting means laterally stabilizing said fins to prevent breaking of fins along bases thereof upon application of an impact load to the trim;

said fins being arranged in a plurality of aligned rows, and said connecting means including a plurality of stabilizers for respectively connecting the fins in each said row; and said rows are spaced from each other in a substantially parallel alignment.

14. The trim structure according to claim 13, further including means for removably attaching said trim to said rigid support member.

15. A trim structure according to claim 14, wherein said rigid support member is a portion of a vehicle body.

16. A trim structure according to claim 13, wherein said fins protrude from the second side of said trim at a predetermined angle such that the fins substantially perpendicularly face the rigid support member when the trim is placed over the rigid support member.

17. A trim structure according to claim 13, wherein said fins and said connecting means plasticly deform substantially downward toward said second side of said trim when said trim covers said rigid support member and is impacted toward said rigid support member.

18. An energy absorbing trim structure comprising:

a trim shell shaped to cover a rigid structural member;

energy absorbing spacer means provided on one face of said trim shell for being non-resiliently crushed between said shell and the rigid structural member when the shell is impacted during a collision, said energy absorbing spacer means being reinforced for lateral stability;

said energy absorbing spacer means including a plurality of separate fins provided in a spaced arrangement on a face of said trim shell and an elongate member interconnecting said fins for lateral stability;

said fins being arranged in a plurality of independent, aligned rows; and said trim structure including a plurality of said elongate members, each of said elongate members connecting all of the fins in one of said independent aligned rows.

19. An energy absorbing trim structure according to claim 18, wherein said trim shell and said energy absorbing spacer means are integrally molded from plastic as a unitary member.

20. An energy absorbing trim structure according to claim 18, wherein said elongate member extends through longitudinally intermediate portions of said fins for interconnecting the fins, extending substantially parallel to said stabilizers.

21. An energy absorbing trim for a vehicle comprising:

a panel shaped to cover a rigid structural member of a body of the vehicle;

a plurality of separate fins provided on one face of said panel in an aligned arrangement; and a stabilizer also provided on said face of said panel and interconnecting said fins to each other for lateral stability;

said fins being disposed in an independent aligned row;

said stabilizer extending through intermediate portions of said fins substantially perpendicular to said fins; and said stabilizer being a substantially linear member and said energy absorbing trim including a single said stabilizer for said aligned row of said fins.

* * * * *

UNITED STATES PATENT AND TRADEMARK OFFICE
CERTIFICATE OF CORRECTION

PATENT NO : 5,795,013
DATED : 18 August 1998
INVENTOR(S): James Keller; Anthony Spataro, Allen White It is certified that error appears in the above-identified patent and that said Letters Patent are hereby corrected as shown below:

Column 4, line 45, after "panel" insert --2--.

Column 5, line 17, begin a new paragraph with "As shown in FIG. 5".

Column 6, line 50 (claim 9, 1st line), change "3" to --7--.

Column 7, line 18 (claim 13, 9th line), change "of fins" to --of said fins--.

Column 8, lines 25-26 (claim 20, 4th-5th lines), delete ", extending substantially parallel to said stabilizers".

Signed and Sealed this

Seventeenth Day of April, 2001

*Attest:*

NICHOLAS P. GODICI

*Attesting Officer*     Acting Director of the United States Patent and Trademark Office